US012234414B2

(12) United States Patent
Boerman et al.

(10) Patent No.: US 12,234,414 B2
(45) Date of Patent: Feb. 25, 2025

(54) PROCESS FOR REMOVING $CS_2$ FROM HYDROCARBON STREAMS (71) Applicant: BASF Corporation, Florham Park, NJ (US)

(72) Inventors: Ernst Boerman, De Meern (NL); Jim Brandts, De Meern (NL)

(73) Assignee: BASF Corporation, Florham Park, NJ (US)

( * ) Notice: Subject to any disclaimer, the term of this patent is extended or adjusted under 35 U.S.C. 154(b) by 25 days.

(21) Appl. No.: 17/594,876

(22) PCT Filed: Jun. 23, 2020

(86) PCT No.: PCT/IB2020/055895
§ 371 (c)(1),
(2) Date: Nov. 2, 2021

(87) PCT Pub. No.: WO2020/261099
PCT Pub. Date: Dec. 30, 2020

(65) Prior Publication Data
US 2022/0195316 A1    Jun. 23, 2022

(30) Foreign Application Priority Data
Jun. 24, 2019 (EP) ..................................... 19182111

(51) Int. Cl.
*C10G 25/05*  (2006.01)
*C10G 25/00*  (2006.01)
*C10G 55/04*  (2006.01)

(52) U.S. Cl.
CPC ........... *C10G 25/05* (2013.01); *C10G 25/003* (2013.01); *C10G 55/04* (2013.01)

(58) Field of Classification Search
CPC ....... C10G 25/003; C10G 25/05; C10G 55/04
See application file for complete search history.

(56) References Cited

U.S. PATENT DOCUMENTS

| | | | | |
|---|---|---|---|---|
| 2,418,047 A | | 3/1947 | Deric et al. | |
| 2,592,523 A | * | 4/1952 | Ayers | B01J 41/14 525/61 |
| 3,306,848 A | * | 2/1967 | Wackher | C10G 25/03 208/310 R |
| 3,658,696 A | * | 4/1972 | Shively | B01J 20/186 208/310 R |
| 3,944,501 A | * | 3/1976 | Whitehurst | C10G 25/02 252/189 |
| 3,998,725 A | * | 12/1976 | Zimmerman | C10G 25/003 208/253 |
| 5,807,475 A | * | 9/1998 | Kulprathipanja | C10G 25/05 208/299 |
| 8,529,857 B2 | | 9/2013 | Sieder et al. | |
| 2005/0098478 A1 | * | 5/2005 | Gupta | C10G 25/00 208/299 |
| 2005/0161370 A1 | * | 7/2005 | Carnell | C10G 25/02 208/299 |
| 2013/0211171 A1 | | 8/2013 | Riemann et al. | |
| 2014/0155669 A1 | * | 6/2014 | Slowing | C10G 25/06 977/773 |
| 2016/0207854 A1 | * | 7/2016 | Weissheimer | B01D 53/8606 |
| 2017/0073589 A1 | * | 3/2017 | Rastelli | C10G 25/12 |
| 2019/0143299 A1 | | 5/2019 | Choi | |

FOREIGN PATENT DOCUMENTS

| | | |
|---|---|---|
| CN | 105498720 A | 4/2016 |
| EP | 0053571 A1 | 9/1982 |
| FR | 3072889 A1 | 5/2019 |
| RU | 2224006 C1 | 2/2004 |
| WO | 2015026649 A1 | 2/2015 |
| WO | WO 2018/029661 A1 | 2/2018 |
| WO | 2018160206 A1 | 9/2018 |

OTHER PUBLICATIONS

Hu, Molecular recognition and adsorption performance of benzothiophene imprinted polymer on silica gel surface, Journal of Fuel Chemistry and Technology, vol. 38, Issue 6, Dec. 2010, pp. 722-729. (Year: 2010).*

Removal and Recovery of Carbon Disulfide Emitted by the Viscose Process: Final Report, by M. J. McIntosh, Energy Systems Division, Argonne National Laboratory, Feb. 1992.

Demirbas, O., Electrokinetic and adsorption properties of sepiolite modified by 3-aminopropyltriethoxysilane, J. Haz. Mat. 2007, 149, 650-656.

Ullmann's Encyclopedia of Industrial Chemistry, chapter on Ethylene, Section 4 Raw Materials, (vol. 13) 2012, Wiley-VCH, Weinheim.

(Continued)

*Primary Examiner* — Michelle Stein
(74) *Attorney, Agent, or Firm* — Lowenstein Sandler LLP (57) ABSTRACT

A process for producing a hydrocarbon stream with reduced $CS_2$ content, comprising contacting a hydrocarbon stream containing $CS_2$ with a solid reactive $CS_2$-scavenger which contains primary and/or secondary amino group-bearing hydrocarbon residues attached to a solid support, at a temperature in the range of from 0 to 300° C., and separating the obtained reaction product of $CS_2$ and reactive $CS_2$-scavenger from the hydrocarbon stream.

4 Claims, 3 Drawing Sheets

(56) References Cited

OTHER PUBLICATIONS

Wamba, A., Grafting of Amine functional group on silicate based material as adsorbent for water purification: A short review, Journal of Environmental Chemical Engineering 6 (2018) pp. 3192-3203.
International Search Report dated Aug. 12, 2020, PCT/IB2020/055895.
Dhanajay B. Puranik et al., "Copper Removeal from Fuel by Solid-Supported Polyamine Chelating Agents," Energy & Fuels, vol. 12, No. 4, Jul. 1, 1998, pp. 792-797.
Rupak Kishor et al., "N 1-(3-Trimethoxysilylpropyl)diethylenetriamine grafted KIT-6 for CO2/N 2 selective separation," RSC Advances, vol. 6, No. 2, Jan. 1, 2016, pp. 898-909.

* cited by examiner

PROCESS FOR REMOVING CS₂ FROM HYDROCARBON STREAMS

This application is a national stage entry filing under 35 U.S.C. § 371 of International Application No. PCT/IB2020/055895, filed on Jun. 23, 2020, which claims priority to European Application No. 19182111.5, filed on Jun. 24, 2019; the content of each application is incorporated herein by reference in its entirety.

The invention relates to the use of a solid $CS_2$-scavenger for removing carbon disulfide ($CS_2$) from hydrocarbon streams, to a process for producing a hydrocarbon stream with reduced $CS_2$ content, specifically to the use of a specific solid reactive $CS_2$-scavenger and its preparation.

The feedstock for steamcrackers (naphtha and condensate) contains considerable amounts of contaminants like sulphur and nitrogen components and metal species. Over the last years, especially the presence of $CS_2$ has become a problem. It was found that $CS_2$ from the contaminated naphtha will pass the furnaces of the cracker unchanged and tend to accumulate in the C5+ fraction (pyrolysis gasoline or pygas) after fractionation. In downstream selective hydrogenation of pyrolysis gasoline using Pd or Ni catalysts, the $CS_2$ leads to rapid deactivation of the catalyst bed which results in frequent regeneration becoming necessary, and in a shorter lifetime. Also when isoprene is extracted from pygas, $CS_2$ is found in the end-product making it less valuable.

Several processes are known, wherein $CS_2$-contaminated hydrocarbon streams are contacted with a solution of amines or polyamines in water. The $CS_2$ will react with the amine to form a dithiocarbamate which is extracted into the water phase and separated from the hydrocarbon stream via phase separation.

U.S. Pat. No. 2,418,047 discloses a process for the removal of carbon disulfide from a hydrocarbon liquid by reacting said liquid with dimethylamine in aqueous solution in order to form aminodithiocarbamate.

EP 0 053 571 A1 discloses the purification of hydrocarbons by treatment with polyamines. For example, tetraethylenepentamine (TEPA) is contacted with a solution of isoprene and pentane containing $CS_2$.

WO 2015/026649 A1 discloses the use of polyamines as a $CS_2$ scavenger in isoprene production. Preferred polyamines are tetraethylenepentamine (TEPA), or diethylenetriamine (DETA). In addition, a quaternary ammonium salt is employed as phase transfer catalyst.

The known processes may be efficient in the removal of $CS_2$, but the use of a fixed bed process or solid adsorbent/absorbent is much more convenient and in most cases preferred over an extraction process.

Removal and Recovery of Carbon Disulfide Emitted by the Viscose Process: Final Report, by M. J. McIntosh, Energy Systems Division, Argonne National Laboratory, February 1992, discloses results for the tests employing different substrates which were reacted with aminosilanes to produce an adsorbent containing amino groups in order to remove the $CS_2$ from water-saturated air. Silica gel or activated alumina was treated with A1120 which appears to be N(beta-aminoethyl)gamma-aminopropyltrimethoxy silane from Silquest.

It was found that these treated adsorbents have no practical value for $CS_2$ recovery from water-saturated air containing approximately 100 ppm of $CS_2$ coming from the viscose process to manufacture rayon or cellulose products. It was found that the amine silane treatment resulted in no significant advantage for $CS_2$ removal when compared to water-washed mordenite which has the most ability to hold $CS_2$. It was, however, found that the amino treatment seemed to improve the ability of active alumina to hold up $CS_2$, but no such difference was noted for silica gel, see sections 4.3.1 and 4.3.2 on pages 64/65 thereof.

In Energy & Fuels, 1998, 12, 4, 792-797, an immobilized chelator (e.g. immobilized diethylenetriamine (DETA) attached to silica) has been used for the removal of copper ions from JP-5 jet fuel.

JP-5 (and JP-8) are both kerosene grade military jet fuels. According to Shell's technical datasheet for JP-5, the fuel is intended specifically for use on naval aircraft carriers. For onboard safety reasons, the specification for flashpoint of JP-5 is set at Fp>60° C. which is considered as high.

According to the literature, kerosene consists of a hydrocarbon mixture with a boiling range starting at 185° C. Because of the boiling rage for kerosene-type fuels in combination with the specification for the high flashpoint of >60° C., it is unlikely that the JP-5 jet fuel contains $CS_2$, since the boiling point of $CS_2$ is only 46.3° C. which is completely out of range of the kerosene boiling range.

Moreover, it is mentioned in the above technical datasheet that jet fuels like JP-5 and 8 are formulated with FSII (fuel system icing inhibitors) and CI/LI (corrosion inhibitors and lubricity improver) additives. In the literature, the corrosion inhibitor in military jet fuel JP-8 (and thus also JP-5) has been analyzed and it was found that the active ingredient of the CI/LI additive was a dimer of linoleic acid. The concentration of the acid was found to be typically 9 to 24 mg/l. Due to the presence of the acid, no adsorption of $CS_2$ can take place.

There are only few fixed bed processes known in the market which claim that they can remove $CS_2$ from naphtha. In US 2017/0073589, $CS_2$ is removed from a hydrocarbon stream by using a clinoptilolite adsorbent or a barium exchanged zeolite adsorbent.

WO 2018/029661 A1 relates to a process for reducing the amount of carbon disulfide ($CS_2$) in a hydrocarbon feed containing $C_5$-$C_8$ fractions. The hydrocarbon feed is treated with an amine functionalized anion exchange resin (basic anion exchange resin) to obtain a mixture comprising a liquid fraction containing treated hydrocarbon and a solid mass containing an adduct of $CS_2$ and the amine functionalized anion exchange resin. The so obtained liquid fraction containing the treated hydrocarbon is separated from the solid mass to obtain the hydrocarbon having $CS_2$ content less than 2 ppm. The amine functionalized anion exchange resin can be regenerated from the solid mass. The continuous process runs at temperatures <40° C., pressures <5 bar and a typical treating time of 1 to 10 hours.

In case of a fixed bed, treating time is equivalent to contact time. WO 2018/029661 describes a process with a treating time of 1 to 10 hours which corresponds to a linear hourly space velocity (LHSV) from 0.1 to 1 h⁻¹. The relatively low space velocity is limited by the typical particle sizes of available resins (0.3 to 1.2 mm).

In processes where large volumes of hydrocarbons are processed, typical LHSV values are in the range of 5 to 10 hr-1 (in some cases even higher) to keep the reactor or adsorbent bed size as small as possible. At these high space velocities, the particle size and shape of the adsorbent is crucial and should be optimized.

The object underlying the present invention is to provide a solid, preferably fixed bed adsorbent and process for the selective removal of $CS_2$ with high capacity from liquid hydrocarbon streams.

The object is achieved according to the present invention by a process for producing a hydrocarbon stream with reduced $CS_2$ content, comprising contacting a hydrocarbon stream containing $CS_2$ with a solid reactive $CS_2$-scavenger which contains primary and/or secondary amino group-bearing hydrocarbon residues attached to a solid inorganic support, at a temperature in the range of from 0 to 300° C., preferably 5 to 200° C., more preferably 10 to 100° C., and separating the obtained reaction product of $CS_2$ and reactive $CS_2$-scavenger from the hydrocarbon stream.

The object is furthermore achieved by the use of the above solid $CS_2$-scavenger for removing $CS_2$ from hydrocarbon streams and by a solid reactive $CS_2$-scavenger which contains primary and/or secondary amino group-bearing hydrocarbon residues attached to a solid inorganic support which is capable of removing $CS_2$ from hydrocarbon streams and which is described in further detail below.

Thus, the present invention also discloses a solid reactive $CS_2$-scavenger, comprising one primary amino group at the end of and at least two secondary amino groups inserted in a linear $C_{3-12}$-alkylene residue which is attached to a solid support, and a process for preparing it by coupling the linear $C_{3-12}$-alkylene residue with the solid support via an alkoxysilyl group, preferably trialkoxysilyl group, preferably by reacting N-(3-(Trimethoxysilyl)propyl)ethylenediamine with silica gel.

The invention finally discloses the use of this solid reactive $CS_2$-scavenger for removing $CS_2$ from fluids containing $CS_2$, preferably from hydrocarbon fluids or streams.

According to the present invention, it was found that $CS_2$ can be selectively removed from steamcracker naphtha without the concomitant removal of other sulphur contaminants typically found in naphtha. The process can be performed on a naphtha containing stream, preferably steam cracker feed stream, or a stream coming from a steam cracker or subsequent extraction and/or distillation unit in which the stream is separated in fractions.

Particle size and shape of the adsorbent can be optimized by choosing the most suitable solid inorganic support and modifying this support with suitable amine functionalities. Especially particles of 1.5 to 10 mm, preferably 1.75 to 7.5 mm, more preferably 2 to 5 mm, most preferably 3 to 5 mm are suitable for large volume processes, where the LHSV can be as high as 20 $h^{-1}$, 15 $h^{-1}$, or 10 $h^{-1}$. No pressure drop issues are expected. Moreover, solid inorganic support based materials can be operated at higher temperatures and pressures, are hardly compressible and not solvent-sensitive compared to resin-based amines.

The $CS_2$-scavengers employed according to the present invention allow for higher space velocities when compared with WO 2018/029661 A1, since the particle size can be freely adjusted to achieve the desired higher space velocity. Typical ion exchange resins as employed according to WO 2018/029661 A1 rely on polymer beads which typically have diameters in the range of from 0.3 to 0.5 mm. A functionalization leads to the swelling of the particles so that final particles will typically have a diameter in the range of from 0.3 to 1.2 mm. This limited particle size leads to a high pressure drop in the practical application. Small space velocities of 0.1 to 1 l/l h and long contact times of 1 to 10 hours result. Depending on the type of solvents, a swelling or shrinking of the resin particles occurs, which might disturb the hydrodynamic flow in the packed bed.

The $CS_2$-scavengers employed according to the present invention show thermal stability, solvent stability, mechanical stability so that a stacking of the adsorbent in a fixed bed is possible. Furthermore, they experience no swelling and can be easily regenerated. They can be operated under high feedstock pressures with pressures of 10 bar or higher.

The solid reactive $CS_2$-scavenger employed according to the present invention is made by immobilizing amine functional groups on a solid support. The term "reactive $CS_2$-scavenger" describes that the amine functional groups undergo a chemical reaction with $CS_2$ leading to the formation of a carbamate group. Thus, the $CS_2$ is not adsorbed or absorbed by the $CS_2$-scavenger in a classical sense, but reacted therewith and consequently covalently bonded therewith.

The solid reactive $CS_2$-scavenger can be employed to treat fluid hydrocarbons which can also be described as hydrocarbon streams. The process can be carried out batch-wise, for example in a stirred reactor, in which a slurry or fluidized solid reactive $CS_2$-scavenger is employed, or, preferably in a continuous manner by employing the solid reactive $CS_2$-scavenger as a fluidized or—most preferred—fixed bed.

The solid reactive $CS_2$-scavenger can be arranged in scrubbing zones having packed beds, ordered packings, monoliths and/or trays. It can for example be arranged in an absorption column building a scrubbing zone for a continuous process. A suitable apparatus is disclosed for example in U.S. Pat. No. 8,529,857 B2.

The solid support can be in any desired shape, e.g. in the form of monoliths, like honeycomb structures or reactor internals (made by e.g. 3D printing or other additive manufacture), or in the form of granules, tablets, extrudates or molded materials. Preferably, the solid support is used in particulate form having an average particle size in the range of from 0.02 to 5.0 mm, more preferably 0.1 to 2.0 mm, most preferably 0.2 to 0.5 mm or in monolith form. Most preferred particles are spheres or granules having a particle size in the range of from 0.1 to 4 mm. For attaining higher space velocities, particle sizes in the range of from 1.5 to 10 mm, preferably 1.75 to 7.5 mm, more preferably 2 to 5 mm or 3 to 5 mm can be preferable. If larger particle sizes are desired as an alternative, they can be in the range from 5 to 10 mm, for example, the particle size can be in the range of from 6.0 to 6.5 mm. The average particle size refers to the number or arithmetical average particle size as determined by optical measurements or sieving, employing sieves or a camsizer. As an alternative, photographic techniques can be employed for determining the number or arithmetical average particle size. In this method, a stream of falling or moved particles is analyzed by a digital stills or video camera and from the pictures obtained, the particle size is determined.

The solid adsorbent is preferably in particulate form, for example as beads or extruded rods. The adsorbents, before use thereof in the method according to the invention, can have been subjected to a usual shaping method such as, for example, pelletizing, tableting or extrusion. The solid adsorbent is preferably used in the form of a bed or as a fixed bed.

The solid support can be chosen from a variety of solid materials which preferably show minor or no attrition, when employed in the process according to the present invention.

The support should furthermore be chemically inert with regard to alkylamines and constituents of hydrocarbon streams.

Preferably, the solid support is selected from silica, alumina, magnesia, titania, zirconia, or mixed oxides thereof or zeolites, aluminosilicates, spinels or carbon, wherein it is also possible to coat these supports with organic layers.

More preferably, the solid support is selected from silica gel, alumina or carbon.

Suitable solid adsorbents are specifically zeolites which are also termed molecular sieves, carbon-based adsorbents, silica gels or activated aluminum oxides.

Preferably, zeolites having a pore size of at least about 4.6 Å are used. Suitable zeolites are, for example, zeolite A (LTA), zeolite X or Y (FAU faujasite family) or zeolite MFI (ZSM-5 and silicalite). Specific examples are zeolite 5A, zeolite 13X, zeolite 4A or mixtures thereof.

Among the A zeolites (LTA), zeolite 4A is particularly suitable, the sodium ions of which are preferably partially replaced by calcium. The Na/Ca degree of exchange is preferably 25 to 85 mol %. Among the zeolites of type X or Y (faujasite FAU), zeolite 13X (NaX) is particularly suitable, wherein other cations, for instance Ca, Ba, Li, Sr, Mg, Rb, Cs, Cu, Ag, can be used for charge balancing. The Si/Al molar ratio can be from 1 to infinity (such as in dealuminized Y zeolites, for example). In these the ratio is infinite. Among the MFI zeolites, ZSM-5 are suitable having an Si/Al molar ratio from 1 to infinity (such as in silicalite, for example).

The carbon-based adsorbents include activated carbons, preferably those having a BET surface area (determined by physisorption of nitrogen at 77 K) from 200 to 2000 m$^2$/g.

In addition, silica gels or activated aluminum oxides are suitable, preferably those having a BET surface area from 100 to 800 m$^2$/g.

The solid reactive $CS_2$-scavenger contains primary and/or secondary amino group-bearing aliphatic hydrocarbon residues attached to the solid support. The residues are preferably attached to the solid support by covalent chemical bonding. Less preferred means for attaching the residues to the solid support are adsorbing them on the surface of the support by ionic, electrostatic or van der Waals forces.

The covalent bonding can be effected through spacer groups which are reactive towards the surface of the solid support. For example, the aliphatic hydrocarbon residue can be coupled with the solid support through an alkoxysilyl group, preferably trialkoxysilyl group like trimetoxysilyl group.

The spacer groups can be aliphatic, aromatic, aralyphatic or alkaromatic groups. Typically, the spacer is an aliphatic hydrocarbon residue which can contain pendant or inserted aromatic groups, like phenyl or phenylene groups. Preferably, the aliphatic hydrocarbon residue contains linear, branched and/or cyclic aliphatic hydrocarbon groups. According to one embodiment of the invention, the spacer is a purely aliphatic hydrocarbon with the amino groups inserted or attached thereto.

The aliphatic hydrocarbon residues bear at least one primary and/or at least one secondary amino group, preferably at least two amino groups. More preferably, they bear at least three amino groups, preferably at least one primary and at least two secondary amino groups. Most preferably, the aliphatic hydrocarbon residue has one primary amino group at the end of and at least two secondary amino groups inserted in a linear $C_{3-12}$-alkylene residue, specifically $C_{5-9}$-alkylene residue, for example $C_7$-alkylene residue.

Preferably, the solid reactive $CS_2$-scavenger is formed by reacting a solid support, selected from silica, alumina and alumina, magnesia, titania, zirconia or mixed oxides thereof or zeolites, aluminosilicates, spinels or carbon with compounds, selected from aminoalkyltrialkoxysilane, N-[3-(trialkoxysilyl)alkyl]alkylenediamine or $N^1$-(3-(trialkoxysilyl) alkyldialhylenetriamine, wherein preferably alkoxy is $C_{1-4}$-alkoxy and alkylene is $C_{1-4}$-alkylene, more preferably with N(trialkoxysilylalkyl)alkylenediamine, like N-(3-(Trimethoxysilyl)propyl)ethylenediamine.

The amount of amino groups can be freely chosen. Preferably, the solid reactive $CS_2$-scavenger contains 0.1 to 60 mmol, more preferably 0.2 to 30 mmol, most preferably 0.5 to 7.5 mmol primary and secondary groups/g of the solid reactive $CS_2$-scavenger including the aliphatic hydrocarbon residues.

The amount of primary amino groups is more preferably 0.1 to 20 mmol, even more preferably 0.2 to 10 mmol/g.

When two secondary amino groups are present per $NH_2$ group, their amount is therefore twice the amount of the above $NH_2$ group content.

The support on which the amine functional groups are grafted is preferably silica, alumina, or carbon. It can be a powder or it can be formed particles like e.g. spheres, for use in a fixed bed. The functional groups are attached to the support, preferably by using silane coupling agents. These products contain usually three hydrolysable alkoxy groups and one organic substituent containing the primary amine functional group. In most cases, the $CS_2$-scavenger is made by contacting the coupling agent with the support in water. Water is not the only solvent, since methanol or toluene is also possible. The scavenger is then cured for example at 90° C., after which the $CS_2$-scavenger is filtered and dried. In this way, the surface of the support is covered with amine functional groups which are able to react with $CS_2$ to form dithiocarbamates.

The products to be used in the process of the invention are for example described in the review in the Journal of Environmental Chemical Engineering 6 (2018), 3192-3203, where 3 preferred amine precursors are mentioned several times. Preferred are the amine precursors aminopropyltrimethoxysilane, N-[3(trimethoxysilyppropyl]ethylenediamine and $N^1$-(3-(trimethoxysilyl)-propyl)diethylenetriamine for the synthesis of the scavenger according to the present invention. In Part 2, Chapter 8 of "Characterization and chemical modification of the Silica Surface" by E. F. Vansant, P. Van Der Voort and K. C. Vrancken, Vol. 93, Elsevier Science, there is general information about grafting of silica surfaces with functional groups, including amino silanes.

Figure 2:
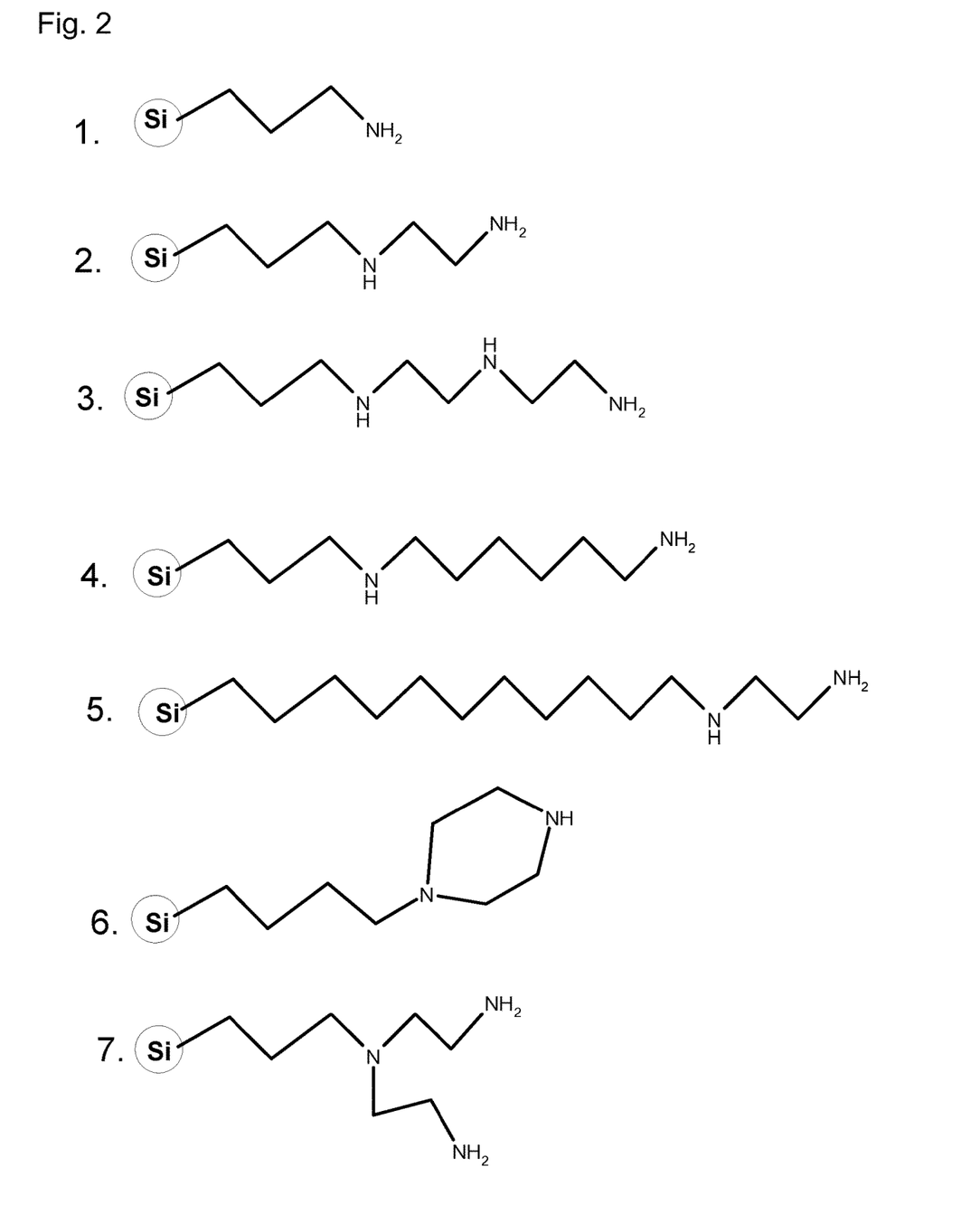
FIG. 2 illustrates the structure of CS2 scavengers of the Examples.

According to one embodiment of the present invention, the solid reactive $CS_2$-scavenger is selected from the scavengers depicted in FIG. 2. Among the scavengers depicted in FIG. 2, the structures 2 and 3 are preferred. The scavenger depicted as structure 2 is most preferred. According to a second embodiment of the present invention, the scavenger is not diethylenetriamine (DETA) attached to silica. Therefore, according to one embodiment of the invention, the scavenger is not structure 3 as depicted in FIG. 2 of the present specification. According to one embodiment of the invention, the scavenger is neither of structure 1 nor 3 as depicted in FIG. 2.

The solid $CS_2$-scavenger as described above is employed for removing $CS_2$ from hydrocarbon streams. Typically, the hydrocarbon stream is a feedstock for steamcrackers, like naphtha or naphtha condensate or a hydrocarbon stream coming from the steamcracker or subsequent extraction and/or distillation unit.

Naphtha is a so-called low boiler which is obtained upon mineral oil or crude naphtha distillation immediately after removing gases at ambient pressure. It can be straight-run or virgin naphtha which is composed mainly of saturated aliphatic hydrocarbons and contains low amounts of aromatics, sulfur and nitrogen. Like naphtha, straight-run gasoline (SRG), light virgin naphtha (LVN) contains mainly $C_5/C_6$-hydrocarbons having a boiling point typically in the range of from 30 to 130° C. Heavy naphtha, straight-run benzene (SRB), heavy virgin naphtha (HVN) contains a major part of $C_{6-12}$-hydrocarbons having a boiling point from 130 to 220° C.

There are different forms of naphtha or naphtha like streams. There can be straight-run naphtha, hydrotreated naphtha, light naphtha, (delayed) coker naphtha, FCC naphtha, condensates from certain gas fields (these gas fields typically come with Hg). For further information on this, reference is made to Ullmann's Encyclopedia of Industrial Chemistry, chapter on Ethylene, Section 4 Raw Materials, (vol. 13) 2012, Wiley-VCH, Weinheim. The $CS_2$ problem in hydrocarbon streams is most pronounced when using coker naphtha. Straight-run naphtha or hydrotreated naphtha have this problem to a lower extent.

Naphtha: 1$^{st}$ petroleum fraction from distillation process;
Light naphtha: IBP of about 30° C. (86° F.) and FBP of about 145° C. (293° F.), contains most of C6 hydrocarbons;
Heavy naphtha: IBP of about 140° C. (284° F.) and FBP of about 205° C. (401° F.), contains most of the hydrocarbons with more than 6 carbon atoms;
Heavy naphtha is the feedstock for reformers;
Full range naphtha: a hydrocarbon stream used as feedstock in streamcrackers with a boiling range of 30 to 200° C.

Furthermore, cracker naphtha, coker naphtha, non-straight-run naphtha, hydro-treated naphtha and light-distillate feedstock (LDF) can be mentioned as preferred possible hydrocarbons.

The preferred hydrocarbon stream employed according to the present invention has a boiling range of from 30° C. to 145° C., corresponding to light naphtha. Most preferred, the hydrocarbon stream contains $C_{1-6}$-hydrocarbons. Thus, according to the present invention, in a preferred embodiment, no hydrocarbons having a boiling point of more than 145° C. are employed. Therefore, no jet fuels are employed which typically have a boiling range from 185° C. to 300° C.

The primary aim of the present invention is the treatment of light naphtha.

Furthermore, in a preferred embodiment, the hydrocarbon stream is free from organic acids. Therefore, the hydrocarbon stream is preferably free from carboxylic acids, dicarboxylic acids or polycarboxylic acids. The presence of organic acids, like carboxylic acids, dicarboxylic acids or polycarboxylic acids in the hydrocarbon stream may hinder the adsorption of $CS_2$.

It is an advantage of the $CS_2$-scavengers of the current invention that they show remarkable selectivity towards other sulfur containing molecules like thiols, thiophenes or sulfides. $CS_2$ is selectively adsorbed on the scavenger whereas the other sulfur containing molecules do not adsorb on the $CS_2$-scavenger. This makes the $CS_2$-scavenger ideal for the selective adsorption of $CS_2$ from steam cracker naphtha without losing valuable S-capacity due to adsorption of sulfur components other than $CS_2$. Separation of sulfur components other than $CS_2$ is feasible using existing assets and hence they will not accumulate in the C5+ fraction.

Furthermore, hydrocarbon fractions, like isoprene, can be employed, as mentioned in WO 2015/026649 A1. Suitable hydrocarbon streams are disclosed in U.S. Pat. No. 2,418,047, EP 0 053 571 A1, WO 2015/026649 A1, US 2013/0211171 A1 and U.S. Pat. No. 8,529,857 B2.

Steamcracker exit streams can be for example $C_1$-, $C_2$-, $C_3$-, $C_4$-, $C_5$-, $C_6$-streams.

The hydrocarbon stream is contacted with the solid reactive $CS_2$-scavenger at a temperature in a range of from 10 to 100° C., preferably 20 to 80° C., most preferably 30 to 60° C. The pressure is typically from ambient (1 bar) to 10 bar, more preferably 1 to 3 bar. The liquid hourly space velocity (LHSV) can be in the range of from 1 to 20/h, preferred 2 to 20/h, more preferred 2 to 15/h, even more preferred 3 to 15/h, preferably 3 to 10/h, more preferably 4 to 10/h, most preferably 4 to 8/h or 5 to 10/h. The higher space velocities are preferred. According to the present invention, the contact time is preferably lower than 1 hour, more preferably lower than 12 minutes, most preferably between 6 and 12 minutes. Most preferably, a contact time in accordance with the above LHSV is chosen, most preferably corresponding to a LHSV of 5 to 10/h.

The hydrocarbon stream most preferably is naphtha or natural gas condensate or a mixture thereof which is fed to a steamcracker. The $CS_2$-scavenger can also be used for the $CS_2$ removal from pyrolysis gasoline (pygas) or isoprene feedstocks.

It is possible to regenerate and reuse the spent $CS_2$-scavenger by an acid and base treatment. Both organic or mineral acids and bases can be used.

The invention is further illustrated by the following examples.

EXAMPLES

Example 1

The $CS_2$-scavenger (structure 2 in FIG. 2) used in this example was made according to a modified literature procedure (J. Haz. Mat. 2007, 149, 650-656).

Silica gel (150.2 g; 0.2 to 0.5 mm silica gel (60 A) from Acros Organics) was mixed with 410 g demi-water in a 1 liter round bottom flask. Eight droplets of surfactant (Dreft from P&G Professional) were added. While swirling the flask, 46.3 gram (200 mmol) of N-(3-(Trimethoxysilyl) propyl)ethylenediamine was dropwisely added. After addition, the flask was connected to a rotary evaporator and heated to 92° C. for 2 hours while rotating the flask at 60 rpm (no vacuum). The flask was then cooled to room temperature, the water layer decanted and the product was washed 3 times with 200 ml demi-water. Finally, the product was filtered and dried in an oven overnight at 105° C.

Analysis: LOI(105): 1.0 wt %. CNS: 7.1 wt % carbon, 3.1 wt % nitrogen, <0.05 wt % sulfur.

The thus prepared $CS_2$-scavenger was tested in a small scale fixed bed reactor. The $CS_2$-scavenger particles (2.00 ml=1.13 g) were premixed with the same volume of inert material (SiC 0.5 mm granules) and loaded in the reactor (diameter=10 mm; L=50 mm). The bed was dried at 120° C. for 2 hours in an argon flow (4 ml/min) and finally cooled to the operation temperature (30° C. and 60° C.). A heptane feed containing 60 ppm $CS_2$ (=50 ppm S) was passed over the bed at 0.2 ml/min (LHSV=6) and 3 barg pressure.

Samples from the reactor were taken and analyzed for $CS_2$ content by gas chromatography.

Figure 1:
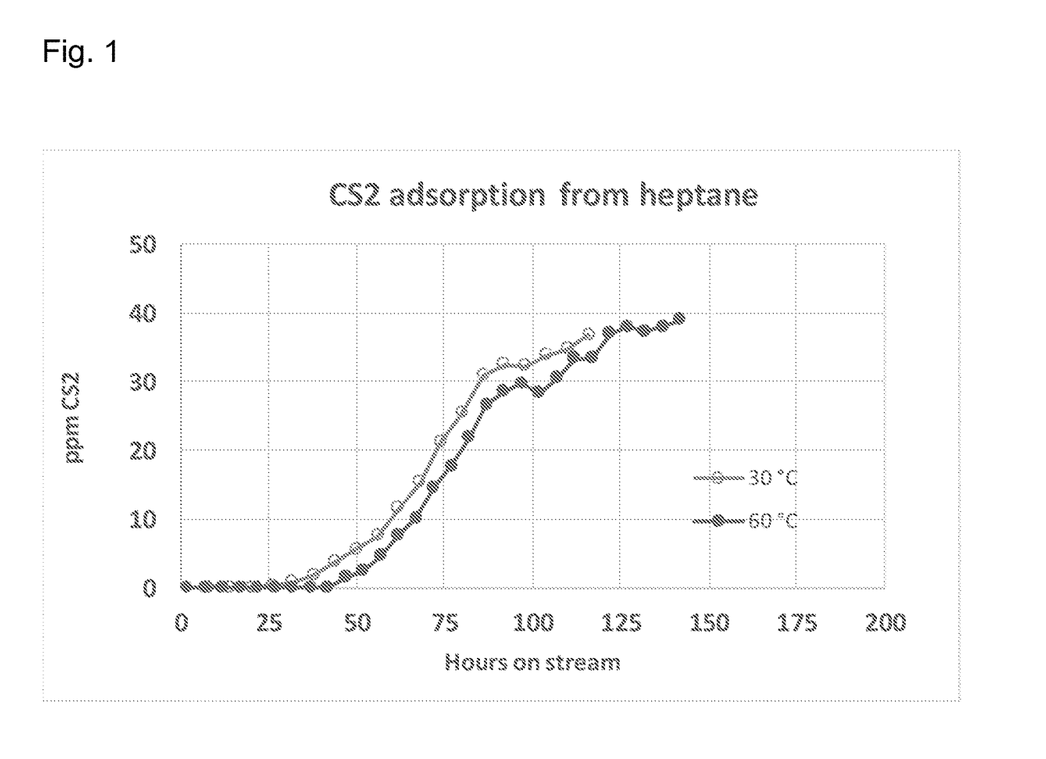
FIG. 1 illustrates the CS2 adsorption from heptane according to Example 1.

The $CS_2$ adsorption from heptane is shown in FIG. 1. FIG. 1 shows the concentration of $CS_2$ in heptane at the outlet of the reactor at 30° C. and 60° C. in time (LHSV=6 $h^{-1}$, and 3 barg). The upper curve was measured at 30° C., the lower at 60° C. The data depicted in FIG. 1 show that the $CS_2$ adsorbent performs surprisingly well. After 102 hours on stream, the $CS_2$-scavenger was washed with heptane, dried and analyzed to determine the amount of carbon, nitrogen and sulfur (see Table 1).

TABLE 1

| | Spent analysis | | |
|---|---|---|---|
| | % C | % N | % S |
| 30° C. | 6.7 | 2.7 | 1.9 |
| 60° C. | 7.1 | 2.6 | 2.1 |

Example 2

Other $CS_2$-scavengers (structures 1, 3, 4, 5 from FIG. 2) containing different amine functionalities were prepared using different amine precursors in a similar way as described in Example 1. The thus prepared $CS_2$-scavengers were also tested in the removal of $CS_2$ from heptane. The preparation method and the CNS-analysis of the spent adsorbents are summarized in Table 2.

A material described in structures 6 and 7 in FIG. 2 can be envisaged to work as $CS_2$-scavengers similarly.

TABLE 2

| Run no. | Structure (see FIG. 2) | Preparation[1] | | | CNS of spent adsorbent[2] | | |
|---|---|---|---|---|---|---|---|
| | | Grafting solvent | Temp ° C. | $NH_2$ groups mmol/g | Carbon % | Nitrogen % | Sulfur % |
| 1 | 1 | $H_2O$ | 92 | 1.2 | 4.6 | 1.5 | 0.5 |
| 2 | 2 | $H_2O$ | 92 | 1.15 | 6.7 | 2.5 | 1.3 |
| 3 | 3 | $H_2O$ | 92 | 1.1 | 8.9 | 3.3 | 2.5 |
| 4 | 2 | Methanol | 35 | 1.19 | 6.3 | 2.5 | 2.2 |
| 5 | 2 | Toluene (dry) | 92 | 1.15 | 8.6 | 2.5 | 2.8 |
| 6 | 4 | $H_2O$ | 92 | 1 | 11.3 | 2.6 | 2.9 |
| 7 | 5 | Toluene (dry) | 92 | 1.1 | 15.1 | 2.5 | 2.7 |

[1] As described in Example 1; $NH_2$ groups by mass balance
[2] Test conditions: 2 cc; 30° C.; 3 bar; LHSV = 6; 50 ppm S in heptane Example 3

In another test, the selectivity of the $CS_2$-scavenger (structure 2 in FIG. 2; 1.2 mmol —$NH_2$/g) towards other sulfur-containing molecules was investigated.

In four different 20 ml flasks, 200 mg of the $CS_2$-scavenger was mixed with 10 ml of heptane. To these flasks was subsequently added an 11-fold excess of $CS_2$, ethyl sulfide, thiophene and propanethiol. The mixture was stirred at ambient temperature and pressure for 18 hours. After filtering and air drying, the carbon, nitrogen and sulfur content of the spent $CS_2$-scavengers were analyzed (see Table 3.)

TABLE 3

| | Spent analysis | | |
|---|---|---|---|
| Sulphur | % C | % N | % S |
| $CS_2$ | 6.7 | 2.7 | 1.4 |
| Propanethiol | 6.7 | 2.7 | <0.05 |
| Ethyl sulphide | 6.6 | 2.7 | <0.05 |
| Thiophene | 6.6 | 2.7 | <0.05 |

Example 4

In another test, a scavenger was prepared and tested on 1 to 3 mm spherical silica particles. (structure 2 in FIG. 2; 1.2 mmol —$NH_2$/g)

40.0 g of Perlkat 97-0 silica particles (1 to 3 mm), were mixed with 109 g demi-water in a 250 milliliter round bottom flask. Four droplets of surfactant (Dreft from P&G Professional) were added. While swirling the flask, 12.3 gram (55 mmol) of N-(3-(trimethoxysilyl)propyl)-ethylenediamine was dropwisely added. After addition, the flask was connected to a rotary evaporator and heated to 92° C. for 2 hours while rotating the flask at 60 rpm (no vacuum). The flask was then cooled to room temperature, the water layer decanted and the product was washed 3 times with 100 ml demi-water. Finally, the product was filtered and dried in an oven overnight at 105° C.

Analysis: LOI(105): 0.2 wt %. CNS: 5.6 wt % carbon, 2.6 wt % nitrogen, <0.05 wt % sulfur.

The $CS_2$-scavenger was then tested in a fixed bed reactor. A bed of 10 ml of the $CS_2$-scavenger particles prepared as described above (10 ml=5.4 g) was premixed with the same volume of inert material (SiC 0.5 mm granules=17 gram) and loaded in the reactor (diameter=9.1 mm; L=23.5 cm). A heptane feed containing 60 ppm $CS_2$ (=50 ppm S) was started over the bed in upflow mode at 0.5 ml/min (LHSV=3) at ambient temperature and 3 barg pressure. Samples from the reactor were taken and analyzed for $CS_2$ content by gas chromatography.

Figure 3:
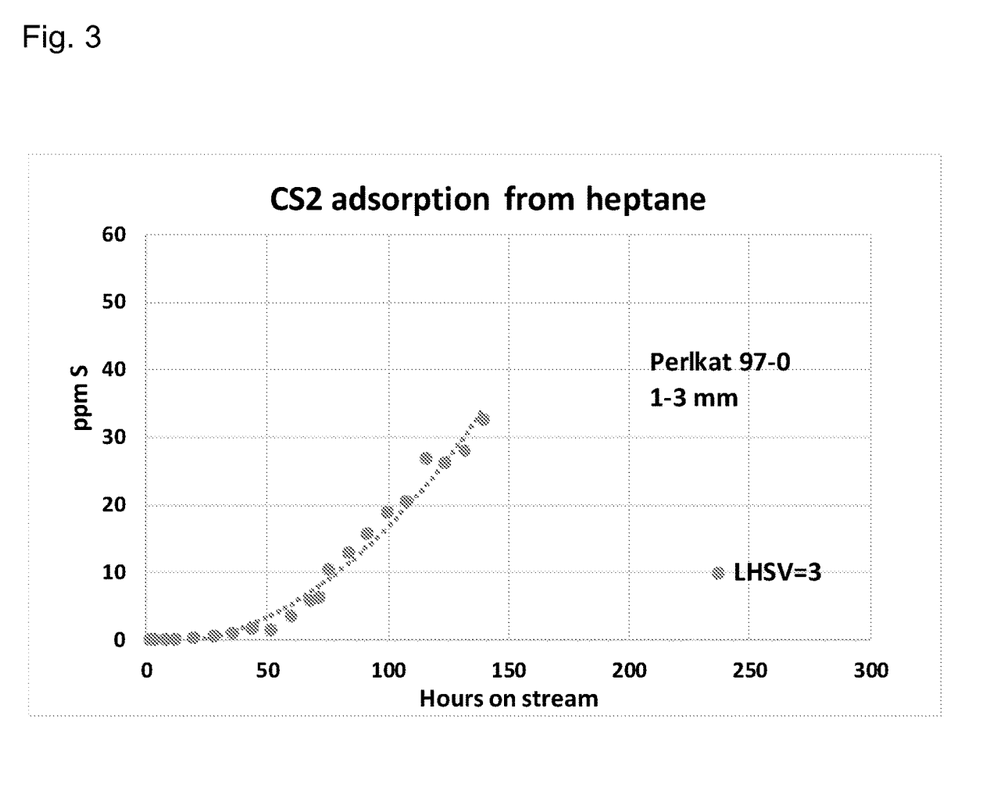
FIG. 3 illustrates the CS2 adsorption from heptane at the outlet according to Example 4.

FIG. 3 shows the concentration of $CS_2$ in heptane at the outlet of the reactor against hours on stream (10 cc adsorbent bed; LHSV=3/h; ambient T; 3 barg). The $CS_2$ adsorption from heptane is show in FIG. 3. The data depicted in FIG. 3 show that the $CS_2$ adsorbent performs surprisingly well even at 1 to 3 mm spherical silica particles at high space velocity.

After 140 hours on stream, the test was stopped. The adsorbent was isolated from the inert material. After air drying, the material was analyzed for CNS.

Analysis: CNS: 6.5 wt % carbon, 2.6 wt % nitrogen, 1.5 wt % sulfur.

Example 5

In a test using the $CS_2$ scavenger from Example 4, 200 mg of scavenger was mixed with 10 ml heptane. To this mixture an 11-fold excess of $CS_2$ was added. The mixture was stirred at ambient temperature and pressure for 18 hours. After filtering and air drying, the carbon, nitrogen and sulfur content of the spent $CS_2$-scavengers were analyzed.

Analysis: CNS: 6.0 wt % carbon, 2.5 wt % nitrogen, 3.0 wt % sulfur.

The invention claimed is:
1. A process for producing a hydrocarbon stream with reduced $CS_2$ content, comprising:

contacting a hydrocarbon stream containing $CS_2$ with a solid reactive $CS_2$-scavenger at a temperature ranging from 0° C. to 300° C.; and separating a reaction product obtained from the contacting, wherein the hydrocarbon stream is a naphtha containing stream, and wherein the $CS_2$-scavenger is formed by reacting a solid support, selected from silica, alumina, magnesia, titania, zirconia, zeolites, aluminosilicates, spinels, or carbon with N-[3-(trialkoxysilyl)alkyl]alkylenediamine or $N^1$-(3-(trialkoxysilyl)alkylenetriamine.

2. The process according to claim 1, wherein the naphtha containing stream is a steam cracker feed stream or a stream coming from a steam cracker, or subsequent extraction, distillation unit, or both.

3. The process according to claim 1, wherein the solid reactive $CS_2$-scavenger is in a form of a slurry, a fluidized bed, or fixed bed.

4. The process according to claim 1, wherein the solid is coated with organic layers.

\* \* \* \* \*